(12) United States Patent
Fasel et al.

(10) Patent No.: US 10,113,672 B2
(45) Date of Patent: Oct. 30, 2018

(54) MULTILAYER TUBE HAVING A TUBULAR INNER FILM, DEVICE AND METHOD FOR PRODUCING SAME, AND USE THEREOF

(75) Inventors: Albert Fasel, Bad Camberg (DE); Rene Quitter, Kirchen (DE)

(73) Assignee: Jurgen Hartenstein (DE)

( * ) Notice: Subject to any disclaimer, the term of this patent is extended or adjusted under 35 U.S.C. 154(b) by 416 days.

(21) Appl. No.: 13/502,492

(22) PCT Filed: Oct. 19, 2010

(86) PCT No.: PCT/EP2010/006362
§ 371 (c)(1),
(2), (4) Date: Sep. 20, 2012

(87) PCT Pub. No.: WO2011/047824
PCT Pub. Date: Apr. 28, 2011

(65) Prior Publication Data
US 2013/0098495 A1 Apr. 25, 2013

(30) Foreign Application Priority Data
Oct. 20, 2009 (DE) .................. 10 2009 050 084

(51) Int. Cl.
*F16L 9/14* (2006.01)
*F16L 11/08* (2006.01)
(Continued)

(52) U.S. Cl.
CPC .............. *F16L 11/08* (2013.01); *B29C 53/48* (2013.01); *B29C 53/382* (2013.01);
(Continued)

(58) Field of Classification Search
CPC .... F16L 11/088; F16L 11/08; F16L 2011/047; B29C 53/48; B29C 53/382; B29C 53/385; B29C 53/58; B26L 2023/006; B29K 2027/18
USPC .......... 138/97–99, 118–153, DIG. 7, DIG. 2, 138/DIG. 3; 425/500–506; 156/244.11–244.27, 149, 188–195; 428/36.91, 34.6, 35.9, 36.1, 36.2, 36.8
See application file for complete search history.

(56) References Cited

U.S. PATENT DOCUMENTS 3,652,375 A * 3/1972 Johnson ................ B29C 70/025
138/144
4,009,063 A 2/1977 Wood
(Continued)

FOREIGN PATENT DOCUMENTS

DE 3435642 A1 4/1986
DE 10242753 A1 3/2004
(Continued)

Primary Examiner — Lien Ngo
(74) Attorney, Agent, or Firm — Mendelsohn Dunleavy, P.C.

(57) ABSTRACT

The invention relates to a multilayer tube, comprising a tubular inner film made of modified polytetrafluoroethylene, and one or more layers of a planar textile fibrous material, which is saturated with a curable resin, and optionally an outer film. The outer film is preferably made of UV impermeable material. The multilayer tube can be used for repairing pipes, but it can also be used as a stand-alone pipe for transporting fluids such as liquids and gases.

14 Claims, 4 Drawing Sheets

Product With Welded Inner Tube (51) Int. Cl.
*B29C 53/48* (2006.01)
*B29K 27/18* (2006.01)
*B29C 53/38* (2006.01)
*B29C 53/58* (2006.01)

(52) U.S. Cl.
CPC ............ *B29C 53/385* (2013.01); *B29C 53/58* (2013.01); *B29K 2027/18* (2013.01)

(56) References Cited

U.S. PATENT DOCUMENTS

| | | | |
|---|---|---|---|
| 4,230,041 A * | 10/1980 | Bailey et al. | 102/275.8 |
| 4,687,677 A * | 8/1987 | Jonasson | B29C 63/0069 |
| | | | 118/642 |
| 4,907,624 A | 3/1990 | Jonasson | |
| 4,950,446 A * | 8/1990 | Kinumoto et al. | 264/516 |
| 5,192,476 A * | 3/1993 | Green | B29C 53/8075 |
| | | | 156/149 |
| 5,375,626 A * | 12/1994 | Fears | 138/103 |
| 5,798,013 A * | 8/1998 | Brandenburger | 156/188 |
| 6,089,277 A * | 7/2000 | Kodama et al. | 138/126 |
| 6,170,531 B1 | 1/2001 | Jung et al. | |
| 6,196,271 B1 | 3/2001 | Braun et al. | |
| 6,334,466 B1 * | 1/2002 | Jani et al. | 138/141 |
| 6,531,559 B1 | 3/2003 | Smith | |
| 6,737,165 B1 | 5/2004 | Smith et al. | |
| 6,758,245 B2 | 7/2004 | Troschitz et al. | |
| 6,807,988 B2 * | 10/2004 | Powell | F16L 11/082 |
| | | | 138/125 |
| 6,823,898 B1 * | 11/2004 | Nie et al. | 138/137 |
| 8,783,300 B2 * | 7/2014 | Hahn | B29D 23/001 |
| | | | 138/125 |
| 2002/0056511 A1 * | 5/2002 | Mathew | B29D 23/001 |
| | | | 156/244.13 |
| 2003/0007789 A1 * | 1/2003 | Pagnella | F16L 53/008 |
| | | | 392/472 |
| 2005/0056962 A1 * | 3/2005 | Martucci | B32B 1/08 |
| | | | 264/171.27 |
| 2005/0155390 A1 * | 7/2005 | Nagasu et al. | 65/531 |
| 2005/0287326 A1 * | 12/2005 | Schunke | B32B 1/08 |
| | | | 428/36.91 |
| 2006/0151043 A1 * | 7/2006 | Nanney | B32B 1/08 |
| | | | 138/125 |
| 2006/0204697 A1 * | 9/2006 | Boles et al. | 428/36.1 |
| 2007/0089797 A1 | 4/2007 | Farnsworth | |
| 2007/0259147 A1 * | 11/2007 | Boudry et al. | 428/36.8 |
| 2008/0184704 A1 | 8/2008 | Bock et al. | |
| 2008/0298788 A1 * | 12/2008 | Martucci | F16L 53/008 |
| | | | 392/472 |
| 2009/0011209 A1 | 1/2009 | Steinberger et al. | |
| 2010/0243097 A1 * | 9/2010 | Jani | 138/129 |

FOREIGN PATENT DOCUMENTS

| | | | |
|---|---|---|---|
| DE | 10359912 A1 | 7/2005 | |
| DE | 102006022904 A1 | 11/2007 | |
| EP | 0357355 | 6/1974 | |
| EP | 0278466 | 8/1988 | |
| EP | 1857259 | 11/2007 | |
| GB | 820121 * | 9/1959 | 138/129 |
| GB | 840602 * | 7/1960 | 138/129 |
| JP | 9-187865 * | 7/1997 | 138/129 |

* cited by examiner

Fig. 4 Product With Welded Inner Tube

Fig. 5 Inner Tubes Welded Together On Their Mounting Assembly (seen from the right)

MULTILAYER TUBE HAVING A TUBULAR INNER FILM, DEVICE AND METHOD FOR PRODUCING SAME, AND USE THEREOF

CROSS-REFERENCE TO RELATED APPLICATIONS

This application is a 371 continuation of PCT International Application no. PCT/EP2010/006362, filed on 19 Oct. 2010, which, in turn claims priority under 35 U.S.C 119 to German patent application no. 10 2009 050084.7, filed on 20 Oct. 2009.

BACKGROUND OF THE INVENTION

Field of the Invention

The invention relates to a multilayer tube which includes a tubular inner film, which consists of a synthetic polymer, a method and a device for producing same as well as the use thereof, in particular for repairing and lining pipe.

Description of Related Art

Tubes of the aforementioned kind are already known for a long time, and the use of these tubes for repairing pipes is already described in several documents including patents and patent applications. Tubes of this kind are also already used widely in practice.

For repairing a pipe the tube is inserted into the interior of the pipe to be repaired and pressed with the aid of air or water under pressure against the inner wall of the pipe, and the tube which initially is foldable and flexible is cured, in order that the tube becomes mechanically stable and forms a permanent unit with the pipe which has to be repaired.

Thus, GB 1 357 355 describes a method whereby first a tubular fibrous planar structure is arranged on a tubular inner film or membrane, and the exterior is closed by a film, which film is welded at the edges. Right before the coating i.e. the lining of the pipe which has to be repaired the layer which contains the fibers is impregnated—the exterior film is punctured for this purpose—by pumping or injection with an uncured synthetic resin. Thereby, an irregular distribution of the resin can take place, what may result in undesirable instability after the curing. As materials which may be used for the inner film and which can also be used for the exterior film conventional resins are suggested such as polyethylene, polyvinylchloride, butyl rubber, cellulose nitrate, neoprene and polyester. No hints are given in this British patent to use a material as is taught by the invention.

A further development is described in DE 2834511 C2 whereby first a layer of curable resin is applied on a tubular inner film, then an extendable and contractable woven layer made of crossing filaments is applied at a nearly equal angle to the longitudinal axis of the pipe on this layer, and thereafter the exterior film is applied. As material for the inner film, an ionomeric resin of the type SURLYN A and polyurethane rubber are suggested. Also mentioned are a polyethylene such as polyethylenevinylacetate and PVC. Also in this document any hint to use the special polymer which shall be used according to the invention is missing.

Apart from the fact that PVC is not suitable for different purposes, the resins mentioned in this document are not resistant enough against different liquids and gases which are to be transported through this pipeline so that a dissolution or crumbling of the material used for the inner film may take place. The dissolution of polymers or impurities of solved or torn off particles, film shreds and so on may be a great drawback, because the material to be transported is polluted or is charged with more ballast material, which may cause further clogging and damage to the pipes. Thus, this may cause the repaired pipes to leak more frequently necessitating further repair or renewal.

EP 0278466 describes multilayer lining tubes which exhibit several fibrous layers. The inner film tube shall consist of a fluid impermeable membrane. Except the indication that this membrane shall consist of a synthetic resin no hints for a choice of materials are given.

In EP 0712352 B1 numerous hints concerning the choice of an apparatus for the manufacture of lining tubes are given. But concrete hints for a suitable choice of a material for the inner film are missing.

DE 6001264 T2, a translation of the European patent EP 1 155 256 B1 describes a liner hose for use in repairing conduits and pipelines including an inner layer, an outer layer and a number of intermediate layers. Also this document gives only general indications concerning the material for the inner and the outer film, such as a fluid tight resin film material; mentioned are polyester, polyethylene, polypropylene, polyamide or a laminate made of these materials. Also, here the known problems concerning the stability of the inner film occur.

DE 10 2006 054 268 A1 describes a tubular formed body including a wall whereby the wall comprises a composite of two layers namely a layer consisting of a fluoropolymeric material and a reinforcing layer. These tubular formed bodies shall be used as charging air conduits of combustion motors. Tubes as disclosed by the invention and uses thereof are not mentioned or rendered obvious by this document.

There are multilayer tubes which were used in practice and which exhibit an inner film produced on the basis of PE/PA, namely polyethylene/polyamide, which, beside that the stability vis-à-vis mechanical and chemical influences is not yet satisfactory, are firmly fixed on the textile layer which lies above so that they cannot be drawn out from the tube which served to repair the pipe, an effect which is often desired.

EP 1 333 210 A1 describes a composite pipe comprising a polytetrafluoroethylene inner layer and a fiber reinforced resin layer as an outer covering layer. These two layers are bound together adhesively and are rendered shear resistant by an intermediate layer made of polyfluoroalkoxytetrafluoroethylene (PFA) and a textile product, in particular a woven fabric. Hints to produce the inner layer from modified polytetrafluoroethylene are not to be found in this European patent application. Further, the inner layer cannot be taken out and thus cannot be recycled. This composite pipe is thus not suitable for the repairing of pipes.

Although already numerous tubes of the kind described above and methods to manufacture same are known and devices to manufacture such multilayer tubes belong to the state of the art there is still a need for tubes of such a kind showing improved properties and methods and devices for manufacturing same.

BRIEF SUMMARY OF THE INVENTION

Therefore it is an object of the invention to provide multilayer tubes which exhibit improved properties compared with multilayer tubes known from the state of the art, in particular an improved chemical and mechanical stability vis-à-vis numerous fluids, i.e. liquids and gases so that the transport of sewage, chemicals, oils etc. is possible without phenomena such as dissolution and/or mechanical damage to the inner film taking place, e.g. tearing off of scraps and smaller particles. These tubes on account of their chemical and mechanical stability are very suitable for the transport of fluids where it is particularly important to avoid the penetration of impurities e.g. transport of drinking water, pure solvents or solutions, are corrosion-resistant and have a long life-time and can be used for many applications. Another object of the invention is to provide multilayer tubes which can be manufactured easily and economically which can be manufactured completely in the factory. Thus, it is possible to deliver immediately on order but also to manufacture for stock. The tubes provided with uncured resin are storable several months, at least 6 months. As the tubes can be stored in a folded state, the space requirement for storage is small. When used they need only be drawn in, expanded and cured. Direct manufacture at the location of use is also possible.

These tube can be used for various purposes, they are temperature resistant, they can be manufactured in different thicknesses and sizes (wall thickness and length) and in different diameters and do not or nearly not elongate when they are drawn in a longitudinal direction into a pipe which has to be repaired, but are sufficiently stretchable in radial direction. Another object of the invention is to provide multilayer tubes where optionally the inner film, e.g. after the insertion of the tube for repairing of a pipe may be drawn out and thus can easily be recycled, but with which it is also possible to prepare a solid connection between the inner film and the layers lying above so that the multilayer tube exhibits a stable cohesion and behaves like a tube made of an uniform material.

This problem is solved by a multilayer tube including as a first layer a tube like inner film of synthetic polymer, and at least a further sheet like layer characterized in that the inner film consists of a modified polytetrafluoroethylene and the tube comprises at least a further sheet like fibrous layer which is impregnated with a curable resin.

Advantageous embodiments of this multilayer tube are that it further comprises an outer film of synthetic polymer, that the outer film consists of modified polytetrafluoroethylene, that the tube includes 2 to 8 sheet like fibrous layers, that the tube includes an outer foil or film which is arranged on one of the fibrous layers, which is UV-light impermeable and optionally laminated with a non-woven, that the inner film is laminated with a non-woven and, optionally, that the non-woven is manufactured from synthetic fibers in particular a spunbond non-woven manufactured from polyethyleneterephthalate fibres, that at least one of the sheet like fibrous layers is a round-woven tube, that the fibers of the sheet like fibrous layer are for the most part directed in the length direction and for a smaller part directed crosswise and that the tube exhibits one or more sheet like fibrous layers which are applied as tapes in a length direction and/or spirally arranged.

A further object of the invention is a method to manufacture multilayer tubes s of a first layer in form of a tube like inner foil of synthetic polymer and at least a further sheet like layer, wherein first a tube like inner film is manufactured from a modified polytetrafluoroethylene, one or more sheet like fibrous layers impregnated with a curable resin are applied to the inner film and optionally an outer film of synthetic polymer is applied.

Advantageous embodiments of this method according to the invention include the method wherein an outer film of modified polytetrafluoroethylene is also applied, the method wherein a non-woven is applied to the inner film, preferentially a spun bond non-woven of polyethyleneterephthalate, the method wherein the tube like inner film is manufactured from a sheet film of modified polytetrafluoroethylene and the sheet film is bonded at overlapping edges, and, optionally the bonding is accomplished by welding or gluing, the method wherein 1 to 8 fibrous layers are applied as fiber tapes according to a winding procedure, the method wherein as sheet like fibrous layers glass fiber wovens, scrims, and/or knitted fabrics and/or glass fiber mats, and/or non-wovens alone or in combination or wovens, scrims, knitted fabrics, mats or non-wovens of synthetic fibrous materials are applied and the method wherein the sheet like fibrous layers are applied with an overlap of 0 to 25%.

Figure 4:
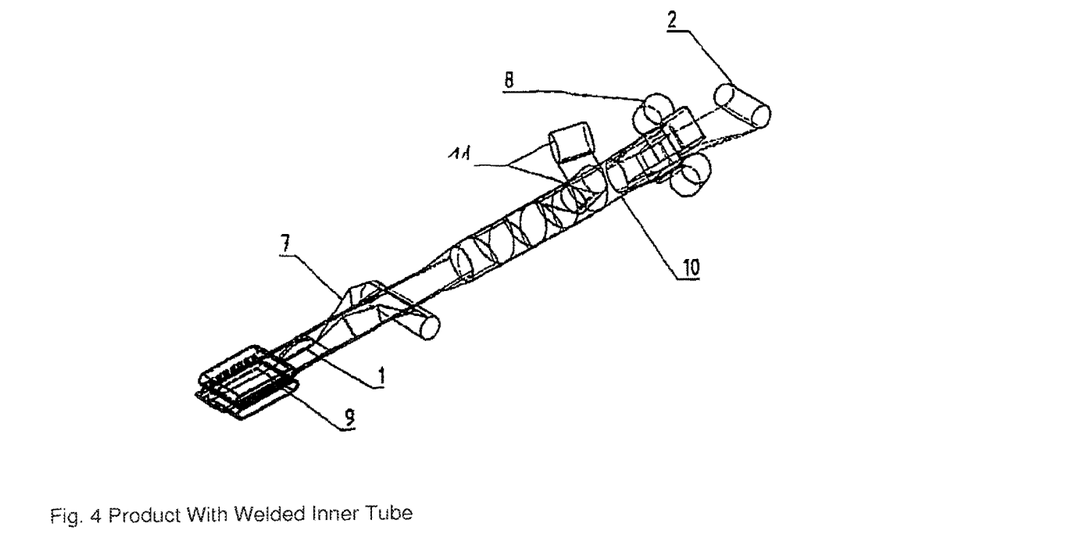
FIG. 4 schematically represents an embodiment of a suitable device for manufacture of the multilayer tubes according to the invention.
Figure 5:
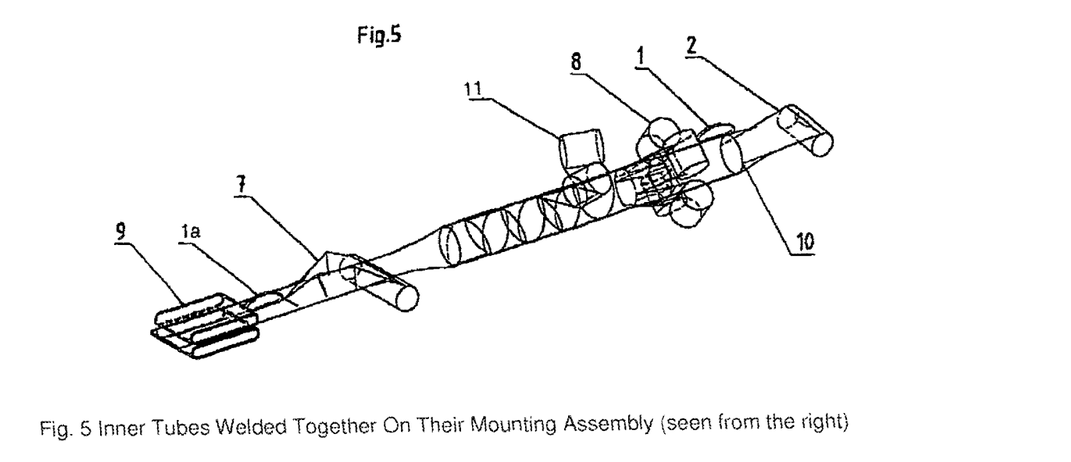
FIG. 5 schematically represents another embodiment of a suitable device for manufacture of the multilayer tubes according to the invention.

A further object of the invention is a device with which advantageously multilayer tubes can be manufactured according to the invention. This device is a device for producing multilayer tubes which include a tube like inner film of a synthetic polymer and at least two sheet like fibrous layers and optionally a tube like outer film, wherein the device includes an assembling pipe, a supplying device to guide a tube film (2) as an inner tube film with the aid of the assembling pipe, one or more rolls to apply one or more tapes (8) as sheet like fibrous layers in a length direction on the assembling pipe, one ore more rolls (11) for application in a spiral form of one or more tapes as sheet like fibrous layers on the assembling pipe, a device (7) to apply a UV-impermeable flat foil, a foil welding device (1) to bind the flat foil as an outer tube and a pulling device (9) comprising two pulling conveyer belts. This device may also be a device for producing multilayer tubes which include a tube like inner film of synthetic polymer and at least two sheet like fibrous layers and a tube like outer film, wherein the device includes a assembling pipe (10), a supplying device to guide a flat film (2) on the outer surface of the assembling pipe, a welding device (1) to weld the flat film at the longitudinal sides, one or more rolls to apply one or more tapes (8) in a length direction, one or more rolls to spirally apply one or more tapes as sheet like fibrous layers over the inner tube film, a device (7) to apply a UV-light impermeable flat film, a film welding device (1a) to connect the flat film at the length sides to an outer tube and a pulling device (9) comprising two pulling conveyer belts.

A further object of the invention is the use of these multilayer tubes for repairing pipelines whereby the multilayer tubes are brought into the pipelines or pipeline sections which are to be repaired whereby they are pressed with the aid of fluid pressure toward an inner wall of the pipe which has to be repaired and thereafter curing the resin in order that the tube adheres firmly to the inner wall of the pipe which has to be repaired. This use may optionally use UV-light is for curing, or use a heated gas in particular vapor is for curing, The tubes may also be used as independent pipes for the transport of gases, liquids and pumpable particles, whereby the tubes are formed in a round tube like shape and the resin is cured with the aid of UV-light or by the influence of heat.

DETAILED DESCRIPTION OF THE INVENTION

The manufacture of the tubes according to the invention can be performed in the following manner.

First, a tube like film is manufactured which shall serve as the inner film in the multilayer tube. Therefore, by directly extruding a modified polytetrafluoroethylene through an annular dye a corresponding tubular film exhibiting the desired diameter is manufactured.

Preferentially, however, first a flat film is manufactured from the modified polytetrafluoroethylene whereby the film is manufactured by extrusion through a flat sheeting dye with a width which is matched to the diameter of the tube which has to be manufactured, or a film exhibiting a greater width is divided by cutting into tapes the width whereof is also so large that one can by folding form a tube of the diameter desired.

Then the film is folded and bonded at the longer sides. This can be done by gluing or by welding. The bonding of the two sides is done with a certain overlap, i.e. the flat film is folded so that at the edges a piece will lie on the edge piece thereunder and the flat sheet is welded to a tube film. Instead of welding, gluing using a customary gluing agent can also be employed.

The amount of overlapping shall be sufficiently large that fast gluing can be performed or that that sufficient area is provided for welding.

Figure 1:
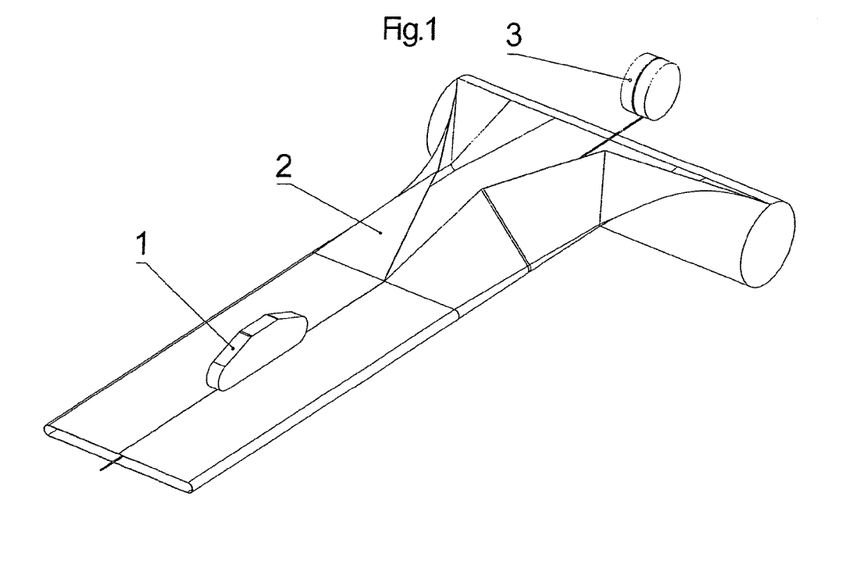
FIG. 1 shows schematically a device which can prepare a corresponding tube film from a flat film.

FIG. 1 shows schematically a device which can prepare a corresponding tube film from a flat film.

The flat film (2) is drawn from a roll and folded together with the edges overlapping.

A welding apparatus (1) welds the overlapping edges together so that a fluid tight tubular film is formed i.e. a film which is substantially impermeable to liquids and gases. The film consists of a modified polytetrafluoroethylene.

In the figure there is depicted a special embodiment of the invention whereby simultaneously from a roll (3) a drawing tape can be drawn during the manufacture of the tubular film. This drawing tape can serve to draw for instance one or more UV-lamps through the completed tube in order to cure the uncured resin located in the further layers of the tube. Instead of UV-lamps of which one or two can be used, for instance in the form of a light chain, also other devices can be drawn through which effect the final curing of non-cured resin in the layers above the tubular film, for instance thermal radiators or infrared radiators or other radiators.

The thickness of the inner film is generally between 20 and 1000 μm, but it may be formed also in thinner or thicker embodiments. The length of the tubular film can be matched to the desired use. Thus, it is possible to manufacture tubes exhibiting a length of a few meters but also up to 300 meters in one piece. Of course, one can also cut greater lengths to smaller lengths.

It is advantageous to simultaneously introduce during the manufacture of the inner film the drawing tape which is at least the length of the tube which has to be produced. This drawing tape can serve, for example, to draw a light chain with UV-lamps through the entire tube in order to cure the non-cured resin of the intermediate layers.

The inner tubular film can also be manufactured from two flat films. Thereby the two flat films can during the manufacture of the tubular film be similarly formed from a flat film bonded by overlapping with one another whereby there are several possibilities for the overlapping.

Figure 6A:
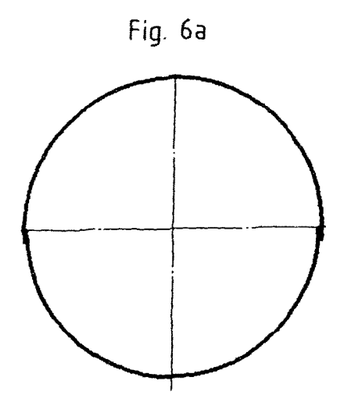
FIG. 6a shows an embodiment where a flat film is overlapping another one at the edges.
Figure 6B:
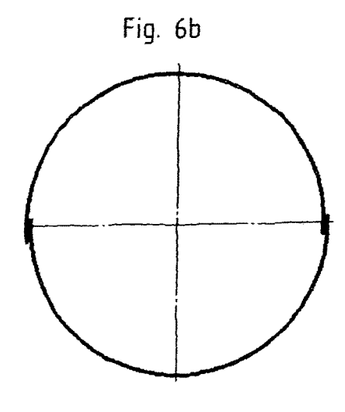
FIG. 6b shows an embodiment where a first film is overlapping the other film at the bonding location, and at the other bonding location the other film is overlapping the first film.

The possibilities for overlapping are schematically presented in FIG. 6. Thus FIG. 6a shows an embodiment where a flat film is overlapping another one at the edges. In FIG. 6b an embodiment is presented where a first film is overlapping the other film at the bonding location, and at the other bonding location the other film is overlapping the first film.

Figure 6C:
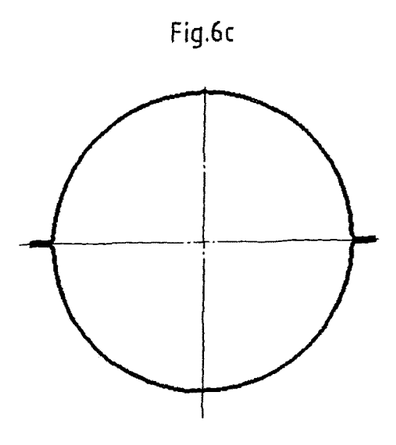
FIG. 6c shows bonding the two flat films whereby the films are folded each at their edges and the folded off parts are glued or welded to one another.

In FIG. 6c a further possibility of bonding the two flat films is shown whereby the films are folded each at their edges and the folded off parts are glued or welded to one another. Embodiments according to FIG. 6a or 6b are preferred.

As material for the manufacture of the inner tube modified polytetrafluoroethylene is used. This material shows for the most part the advantageous properties of resistance against chemicals as is exhibited by pure polytetrafluoroethylene (Teflon), on the other hand however it is better for working than Teflon itself.

For the manufacture of the multilayer tubes according to the invention is particularly suitable a device as is schematically presented in FIG. 4 or FIG. 5.

In FIG. 4, (2) presents an already finished tubular film formed from modified PTFE which is pulled through the assembling tube (10). One or more impregnated woven webs (8) are pulled in the length direction from one or more rolls from one or more sides onto the tube. From one or more further rolls one or more woven webs are spirally wound over the woven webs which are directed in the length direction. (7) presents an outer film which has already been applied to the inner foil provided with textile fabrics and which is welded with a welding device (1) or optionally bound with the aid of a gluing agent. Behind the tube (10) the woven webs are pulled over the inner film.

(9) is a traction conveyor belt from which the multilayer tube is pulled.

FIG. 5 differs from FIG. 4 insofar that there is a flat film of modified PTFE pulled from a roll which embraces the pipe from outside and which is welded with a welding device (1) at the edges. Then the impregnated fibrous tapes e.g. woven tapes are spirally wound on the inner tubular film in longitudinal direction.

The device which is schematically represented in FIG. 5 is used preferentially within the context of the invention. It presents inter alia the advantage that the impregnated webs do not directly touch the pipe during assembly to guarantee a better, cleaner and more maintenance free production process.

Modified polytetrafluoroethylene is per se already known. Within the scope of the invention, however, a modified polyethylene as disclosed in U.S. Pat. No. 6,531,559 B1 is particularly advantageous. This document is expressively referred to and the content of this patent is hereby incorporated by reference herein.

The properties of these modified polytetrafluoroethylenes of which the inner film preferentially consists according to the invention, are extensively described in this US patent as well as the production of the same as well as appropriate measurement methods for the determination of the properties.

Preferentially, the modified polytetrafluoroethylene exhibits a melt index between 0.25 and 50 g/10 min, a strain at break of at least 10%, a crystallinity of 1 to 55%, a proportion of comonomers of less than 1 weight percent and less than 0.5 mol %.

The comonomers are preferentially chosen from the group of hexafluoropropylene and per perfluoro(alkylvinylether).

The plateau-value of the complex viscosity measured at frequencies under 0.01 rad/s and a temperature of 380° C. is preferentially between $2 \times 10^4$ and $10^9$ Pa·s. The modified polytetrafluoroethylene which is preferred according to the invention is also explained in DE 601 29 112 T2 from the same applicant as U.S. Pat. No. 6,531,559 B1. Also this publication is expressively referred to and hereby incorporated by reference in its entirety.

The inner film which is used according to the invention can also advantageously consist of a material which is available from the Company ElringKlinger AG, D-72581 Dettingen under the brand Modflon.

Also other commercial modified polytetrafluoroethylenes can be used.

In a further preferred embodiment of the invention, a non-woven is first attached to the inner film, in particular a so-called spun bond non-woven which is a random non-woven of continuous filaments of polyethyleneteraphthalate. Such non-wovens are available from the Firm John's Manville, D 86399 Bobingen. Non-wovens made from another synthetic materials can also be used, e.g. preferentially from polyacryl.

The film tube which serves as the inner lining film is laminated with a coating of a non-woven or without the respective coating with one or more sheet like fibrous layers. The fibrous layers can be made from woven materials, non-woven materials, knitted fabrics or similar products which are impregnated with a curable resin or which may be impregnated with a curable resin after having been put on the inner film.

The impregnation of the sheets can take place in a conventional tub which is filled with a corresponding curable resin through which the sheet like tape is drawn. The not yet cured resins may be conventional curable resins. Known products such as Palatal 92 I from BASF Ludwigshafen or Oldupal A 410 I from BUETA may be employed.

The not yet cured resin can be cured in any usual way e.g. by treating with UV-light. Curing is also possible by a hot vapor or warm water curing. Of course other hot gases in particular water vapor may be used. When using gases or water this fluid can simultaneously serve to exert a pressure on the tube in order that the tube is pressed to the inner wall of the pipe which is to be repaired.

The coating with the aid of the fibrous sheet like bodies takes place preferentially according to the winding procedure with the aid of sheet like fibrous tapes, in particular woven tapes which are directed in the longitudinal direction.

For this purpose a method and a device can serve as described in European patent EP 0712352 B1. This document is expressively referred to in the disclosure of this patent and the disclosure is incorporated by reference herein.

Preferentially, according to the invention a device is used as described in claims 19 and 20. This device which is explained schematically with reference to FIGS. 4 and 5 allows simultaneously application of tapes which are directed in the length direction and spirally wound.

As final layer of a further film may be added, preferentially a film made of the same material as the inner film i.e. of a modified polytetrafluoroethylene.

Other further commercial films may be added, in particular PA/PE films (polyamide/polyethylene). When using a UV-curable resin the outer film shall be UV-light impermeable.

In a preferred embodiment the outer film is laminated with a non-woven as well and then added to the fibrous sheet like layers. Thus, during curing a better, more stable connection with the sheet like fibrous layers is achieved. As non-woven, a polyester non-woven can be employed. Non-wovens from other materials can be used as well.

The thus made tube is then pulled in a corresponding length into a pipe which has to be repaired, thereafter a pressure is produced with the aid of a fluid in particular with the aid of air, whereby the tube is pressed towards the inner wall of the pipe which has to be repaired. Thereafter the curing takes place. Thereby the tube solidifies and rests fast against the pipe which has to be repaired. The cured tube exhibits a self supporting character.

The tube according to the invention makes possible the transport of practically all types of fluids such as gases, liquids such as oils, sewage, chemical solutions and even pumpable pourable particles. The inner film is chemically and mechanically very stable, thus particles of the inner wall are not dissolved in use to cause pollution of the material which has to be transported. Further it is avoided that the inner wall is destroyed by chemical processes. As the wall is also very stable it is avoided that by mechanical friction particles or scraps of the inner wall are torn off and that after a short time another repair is necessary.

The tubes according to the invention may also be worked to independent tubes in the form of pipes so that they are self-supporting independent pipes which can be used for the transport of fluids and pourable particles.

A particular advantage of the invention is that according to the invention multilayer tubes can be produced which, if a non-woven is not attached to the inner film, the inner film can be pulled out after the repairing of the pipe and can be recycled in a simple manner.

The production is also very simple and economic. A further advantage is that pipes according to the invention can be produced having different diameters by altering the number of layers which are put on the tube in the length direction or for layers which are spirally wound onto the tube to increase the thickness of the pipe wall. A desired diameter can also be achieved with the aid of tapes which are put on in the length direction such that the strain in length direction is reduced.

A further advantage is that for the embodiment where a non-woven is put on the inner film the cohesion of the individual layers in the multilayer pipe is very stable so that the pipe is behaving like a pipe made of a single material. The inner film is giving the finished pipe special properties in particular the ability to be used for a broad spectrum of fluids such as liquids or gases. The pipes are also very suitable for the transport of drinking water without fearing that during the transport the quality of the drinking water is reduced by the lining of the pipe.

The pipes are mechanically very stable, stable against corrosion, and pipes repaired in the respective way show a longer life time so that the cycle of repair can be prolonged considerably.

Figure 2A:
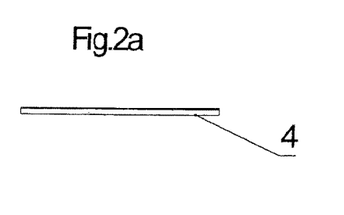
FIG. 2a shows a part of a coated inner film which is coated with a non-woven.
Figure 2B:
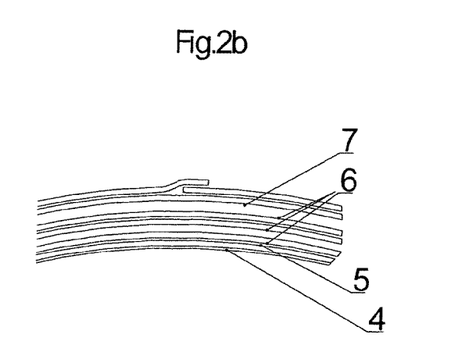
FIG. 2b shows a partial section of a multilayer tube on which is put a further woven layer, a further layer of impregnable material and an outer film which is UV-light impermeable and coated with a non-woven.
Figure 3A:
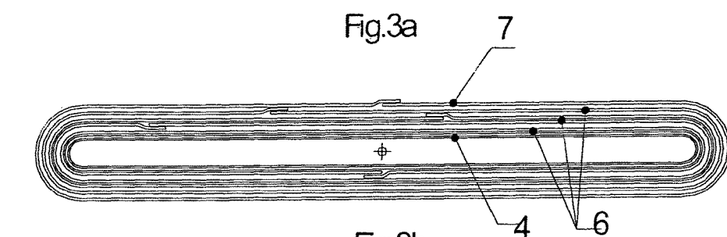
FIG. 3a shows a multilayer tube according to the invention in folded form.
Figure 3B:
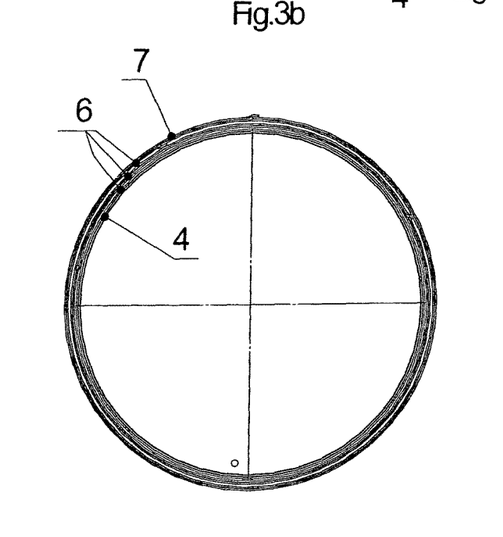
FIG. 3b shows this tube in a round form as it is obtained after introduction into a pipe which has to be repaired and subsequently being inflated with air.

FIG. 2a shows a part of a coated inner film 4 which is coated with a non-woven. FIG. 2b shows a partial section of a multilayer tube on which is put a further woven layer 5, a further layer of impregnable material 6 and an outer film which is UV-light impermeable and coated with a non-woven. FIG. 3a shows a multilayer tube according to the invention in folded form. FIG. 3b shows this tube in a round form as it is obtained after introduction into a pipe which has to be repaired and subsequently being inflated with air.

The invention is further illustrated by the following example.

The described tube is prepared at the factory according to the requirements of the pipe which has to be repaired. Diameter, length and thickness are mated correspondingly. Thereafter the tube is wound and folded and transported to the place where it will be used. Before the tube is put in, a video inspection of the old pipe which has to be repaired as well as a cleaning with the aid of a cleaning robot is performed. Damages and penetrated roots are mechanically taken away with the aid of the robot. Then the tube is pulled into the pipe via winches through the channel or corresponding inspection opening until it reaches the next opening. The UV-light source is located inside the beginning of the tube. The ends of the tubes are closed air tight with lids and inflated. The tube is pressed on the old pipe by the air pressure and the UV-light source is turned on. Through openings in the lid a cable is guided to provide the light source with electricity, and the light source is pulled through the tube. The resin is activated by the UV-radiation and the curing begins. After curing, the lid, the light source and the inner film are removed and deviations are milled away with the aid of the robot. If an inner film coated with a non-woven is used this inner film remains in the pipe as a permanent coating. Further the beginning and the end are mated to the pipe and finally the repaired pipe is video documented.

The invention claimed is:

1. A method of using a multilayer tube for repairing a pipeline,
    said multilayer tube comprising a first layer of a tubular innermost film of synthetic polymer, and at least a further sheet layer, characterized in that the tubular innermost film forms a layer that is continuous in a lengthwise direction of the multilayer tube and consists of a modified polytetrafluoroethylene wherein the modified polytetrafluoroethylene has a melt flow index between 0.25 and 50 g/10 min, a strain at break of at least 10%, a crystallinity of 1 to 55%, and a proportion of comonomers of less than 1 weight % and less than 0.5 mol %, and the multilayer tube comprises at least a further fibrous sheet layer which is impregnated with a curable resin and a UV-light impermeable outer foil or film which is arranged on one said fibrous sheet layer,
    said method comprising steps of:
    locating the multilayer tube in a pipeline or pipeline section to be repaired;
    pressing the multilayer tube with the aid of fluid pressure toward an inner wall of the pipeline or pipeline section to be repaired; and thereafter
    curing the resin in order that the tube adheres firmly to the inner wall of the pipeline or pipeline section to be repaired.

2. The method according to claim 1 characterized in that it further comprises an outer film of synthetic polymer.

3. The method according to claim 2, characterized in that the outer film consists of modified polytetrafluoroethylene.

4. The method according to claim 1, characterized in that the tube comprises 2 to 8 fibrous sheet layers.

5. The method according to claim 1, wherein the outer foil or film is laminated with a non-woven.

6. The method according to claim 1, characterized in that the tubular innermost film is laminated with a non-woven.

7. The method according to claim 6, characterized in that the non-woven is manufactured from a spunbond non-woven manufactured from polyethyleneterephthalate fibers.

8. The method according claim 1, characterized in that at least one said fibrous sheet layer is a round-woven tube.

9. The method according to claim 1, characterized in that the fibers of the at least one said fibrous sheet layer are for a larger part directed in the length direction and for a smaller part directed crosswise.

10. The method according to claim 1, characterized in that the multilayer tube comprises one or more fibrous sheet layer tapes applied in a length direction and/or spirally arranged.

11. A device for producing a multilayer tube,
    wherein said multilayer tube comprises a first layer of a tubular innermost film of synthetic polymer, and at least a further sheet layer, characterized in that the tubular innermost film forms a layer that is continuous in a lengthwise direction of the multilayer tube and consists of a modified polytetrafluoroethylene wherein the modified polytetrafluoroethylene has a melt flow index between 0.25 and 50 g/10 min, a strain at break of at least 10%, a crystallinity of 1 to 55%, and a proportion of comonomers of less than 1 weight % and less than 0.5 mol %, and the multilayer tube comprises at least a further fibrous sheet layer which is impregnated with a curable resin and a UV-light impermeable outer foil or film which is arranged on one said fibrous sheet layer,
    wherein the device comprises:
    an assembling pipe;
    a supplying device to guide a tube film as the tubular innermost film with the aid of the assembling pipe;
    one or more rolls to apply one or more fibrous sheet layer tapes in a length direction on the assembling pipe;
    one or more rolls for application in a spiral form of one or more fibrous sheet layer tapes on the assembling pipe;
    a device to apply a UV-impermeable flat foil;
    a foil welding device to bind the flat foil; and
    a pulling device comprising two pulling conveyer belts.

12. A device for producing a multilayer tube,
    wherein said multilayer tube comprises a first layer of a tubular innermost film of synthetic polymer, and at least a further sheet layer, characterized in that the tubular innermost film forms a layer that is continuous in a lengthwise direction of the multilayer tube and consists of a modified polytetrafluoroethylene wherein the modified polytetrafluoroethylene has a melt flow index between 0.25 and 50 g/10 min, a strain at break of at least 10%, a crystallinity of 1 to 55%, and a proportion of comonomers of less than 1 weight % and less than 0.5 mol %, and the multilayer tube comprises at least a further fibrous sheet layer which is impregnated with a curable resin and a UV-light impermeable outer foil or film which is arranged on one said fibrous sheet layer, wherein the device comprises:

an assembling pipe;

a supplying device to guide a flat film on the outer surface of the assembling pipe;

a welding device to weld the flat film at the longitudinal sides;

one or more rolls to apply one or more tapes in a length direction;

one or more rolls to spirally apply one or more fibrous sheet layer tapes over the innermost tubular film;

a device to apply a UV-light impermeable flat film;

a film welding device to connect the flat film at the length sides to an outer tube; and a pulling device comprising two pulling conveyer belts.

13. The method according to claim 1, wherein UV-light is used for the curing.

14. The method according to claim 1, wherein a heated gas is used for the curing.

* * * * *